United States Patent [19]

Reinhard et al.

[11] 4,454,841
[45] Jun. 19, 1984

[54] AUTOMATIC LIQUID THERMAL PRESSURE REGULATOR AND BALANCING SYSTEM

[75] Inventors: George G. Reinhard, Warren; Gordon L. Osgood, Sr., Romeo; Ronald A. Kinde, Sr., Mount Clemens, all of Mich.

[73] Assignee: Optimizer, Ltd., Flint, Mich.

[21] Appl. No.: 260,594

[22] Filed: May 6, 1981

Related U.S. Application Data

[63] Continuation-in-part of Ser. No. 172,471, Sep. 16, 1980, abandoned.

[51] Int. Cl.³ ............... F02M 27/02; F02M 31/12
[52] U.S. Cl. .................... 123/3; 123/552; 123/557; 123/575
[58] Field of Search .......... 123/1 A, 3, 557, 549, 123/552, 575; 44/57, 66, 72

[56] References Cited

U.S. PATENT DOCUMENTS

| | | | |
|---|---|---|---|
| 3,110,296 | 11/1963 | Lundi | 123/122 |
| 3,224,171 | 12/1965 | Bowman | 55/274 |
| 3,243,010 | 3/1966 | Flynn | 181/50 |
| 3,350,878 | 11/1967 | Lambert | 60/30 |
| 3,386,426 | 6/1968 | Kamijo | 123/119 |
| 3,470,689 | 10/1969 | Gurr | 60/30 |
| 3,511,617 | 6/1970 | Lyben | 23/288 |
| 3,672,851 | 6/1972 | Ihm | 44/7 B |
| 3,892,211 | 7/1975 | Oyama | 123/122 |
| 3,951,124 | 4/1976 | Fairbanks et al. | 123/122 |
| 4,003,356 | 1/1977 | Naylor | 123/122 |
| 4,032,310 | 6/1977 | Ignoffo | 55/276 |
| 4,074,661 | 2/1978 | Noguchi et al. | 123/3 |
| 4,090,484 | 5/1978 | Itoh et al. | 123/577 |
| 4,180,036 | 12/1979 | Wolf | 123/557 |
| 4,803,051 | 12/1981 | Weishaar | 123/3 X |

Primary Examiner—William A. Cuchlinski, Jr.
Attorney, Agent, or Firm—Basile, Weintraub & Hanlon

[57] ABSTRACT

An automatic thermal pressure regulator and balancing system adapted for use in an internal combustion engine having a fuel supply conduit connecting a fuel supply and a carburetor. The regulator includes a hollow housing interposed with the fluid supply conduit between the fuel supply and the carburetor. A metallic tubular member is disposed within the housing and includes an inlet disposed in fluid communication with the fuel supply conduit and a pair of outlets communicating with the interior of the housing. A heating element is mounted within the tubular member for heating the fuel flowing between the inlet and outlets of the tubular member. First, second and third co-linear chambers are formed within the housing, with the first and third chambers filled with a metallic mesh material and the second chamber filled with a catalytic agent material reactive with the fuel. Fuel entering the housing flows through the tubular member and is heated by the heating element before exiting into the interior of the housing. The fuel then flows through the first, second and third chambers of the housing before passing through the outlet of the housing into the carburetor. In an alternate embodiment, synthetic fuel in the form of a cellulose nitrate suspension is added to the conventional fuel in predetermined quantities.

10 Claims, 3 Drawing Figures

AUTOMATIC LIQUID THERMAL PRESSURE REGULATOR AND BALANCING SYSTEM

CROSS REFERENCE TO CO-PENDING APPLICATIONS

This application is a continuation-in-part of co-pending application, Ser. No. 06/172,471, filed Sep. 16, 1980, in the names of George G. Reinhard and Gordon L. Osgood, Sr. now abandoned.

BACKGROUND OF THE INVENTION

1. Field Of The Invention:

This invention relates, in general, to internal combustion engines and, more specifically, to fuel/air mixing systems for internal combustion engines.

2. Description Of The Prior Art:

Growing concerns of today's motorists are an adequate supply of fuel for vehicles and the rising costs thereof. Coupled with this concern is the enhanced awareness of the ecological damage resulting from the emission of pollutants from fuel-burning, internal combustion engine powered, motor vehicles. In an internal combustion engine, the pollutants include oxides of nitrogen, carbon monoxide and unburned hydrocarbons. In addition to creating an ecological problem, the unburned hydrocarbons also contribute to insufficient engine operation due to their accumulation in the combustion chamber of the engine. Further, in existing internal combustion engines, a measurable portion of the fuel supplied to the engine remains unburned and is discharged into the atmosphere. This not only pollutes the atmosphere, but it also results in uneconomical engine operation and poor engine performance.

Many attempts have been made to ensure a more complete combustion of the fuel in internal combustion engines. Many of these attempts have involved the utilization of a vaporizing apparatus to vaporize the fuel/air mixture before it is passed to the combustion chambers of the engine. It is also well-known to provide suitable heating apparatus within the carburetor to heat the fuel/air mixture to a temperature more conducive to complete combustion prior to its entry into the combustion chambers. Such vaporizing and heating apparatus are typically mounted between the carburetor and the intake manifold of the engine so as to vaporize and/or heat the final fuel/air mixture passing therebetween.

However, such attempts at improving engine efficiency and performance by heating or vaporizing the fuel/air mixture prior to its entry into the combustion chambers have met with limited success at reducing engine pollutants.

Apart from the techniques used to improve engine performance by more completely burning the fuel/air mixture, additional pollutant control devices, such as the now prevalent catalytic converter, have come into use to reduce the amount of pollutants issuing from vehicle exhaust systems.

Such catalytic converters, while greatly reducing the amount of gaseous contaminants issuing from the vehicle exhaust systems, are quite costly and require modification of the vehicle for their installation. A large part of the cost is due to the quantity of platinum based materials used in their construction. Such converters also require specific types of fuel and, if wrong fuel is used, become clogged. This not only reduces their effectiveness in reducing air pollutants issuing from the vehicle but also severely impairs engine performance.

Thus, the prior art has utilized separate devices to either improve engine performance or reduce pollutants issuing from the vehicle exhaust system. Such devices, while functioning satisfactorily to a certain extent in achieving the intended purpose, do little or nothing at reducing the pollutants or improving engine performance for which they are not intended.

Thus, it would be desirable to provide a fuel/air mixing system for use with internal combustion engines which overcomes the problems with prior art devices in improving engine efficiency, i.e., decreasing the amount of fuel utilized per distance driven, as well as reducing the quantity of air pollutants issuing from the vehicle exhaust system. It would also be desirable to provide a fuel/air mixing system which is constructed as a single device and which functions to both improve engine performance and reduce pollutant levels. It would also be desirable to provide a fuel/air mixing system which can be easily incorporated in existing internal combustion engine designs without extensive modification thereof. Finally, it would be desirable to provide a fuel/air mixing system which is economical in cost.

SUMMARY OF THE INVENTION

There is disclosed herein a new and improved automatic liquid thermal pressure regulator and balancing system adapted for use in an internal combustion engine having a fuel supply conduit connecting a fuel supply and a carburetor. The regulator includes a hollow housing interposed with the fuel supply conduit between the fuel supply and the carburetor. A metallic tubular member is disposed within the housing and includes an inlet disposed in fluid communication with the fuel supply conduit and a pair of outlets communicating with the interior of the hollow housing. A heating element in the form of an elongated rod is secured within the tubular member. Sensing means are provided for maintaining the temperature of the heating element within a predetermined range. First, second and third co-linear chambers are formed within the housing. The outlet ports of the tubular member are disposed in communication with the first chamber and the outlet port of the hollow housing is in communication with the third chamber. The first and third chambers are filled with a metallic mesh material; while the intermediate second chamber is filled with a catalytic agent material which is reactive with the fuel. The fuel from the fuel supply flows through the tubular member from the inlet to the outlet ports thereof. While flowing through the tubular member, the fuel is heated to a predetermined temperature for optimum combustion. The fuel then exists through the outlet of the tubular member and enters the interior of the housing in which it passes consecutively through the first, second and third chambers before exiting through the outlet port.

The outlet port of the housing is connected to a conventional fuel filter having a first outlet connected to the carburetor and a second outlet connected in a by-pass arrangement with the fuel supply conduit to return a portion of the fuel flowing therethrough back through the regulator housing.

In an alternate embodiment, a synthetic based fuel in the form of a cellulose nitrate suspension is added to the conventional fuel in a predetermined quantity. According to one method, the synthetic fuel is added in a predetermined quantity to the fuel supply. According to another method, a separate auxiliary fuel supply tank is provided for storing the synthetic fuel. A metering apparatus is connected between the auxiliary synthetic fuel supply and the intake manifold of the engine for supplying the synthetic fuel thereto in predetermined metered quantities.

The pressure regulator of the present invention overcomes many of the problems of similar prior art devices in improving engine performance and efficiency; while, at the same time, significantly reducing the levels of pollutants issuing from the vehicle exhaust system. In addition, the pressure regulator of the present invention achieves both desired features in a single unit as compared to prior art attempts which maximized engine efficient or reduced pollution levels by use of separate devices installed on the vehicle. Furthermore, the pressure regulator of the present invention is both economical in cost and easy to install on conventional internal combustion engines without requiring modifications thereto.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
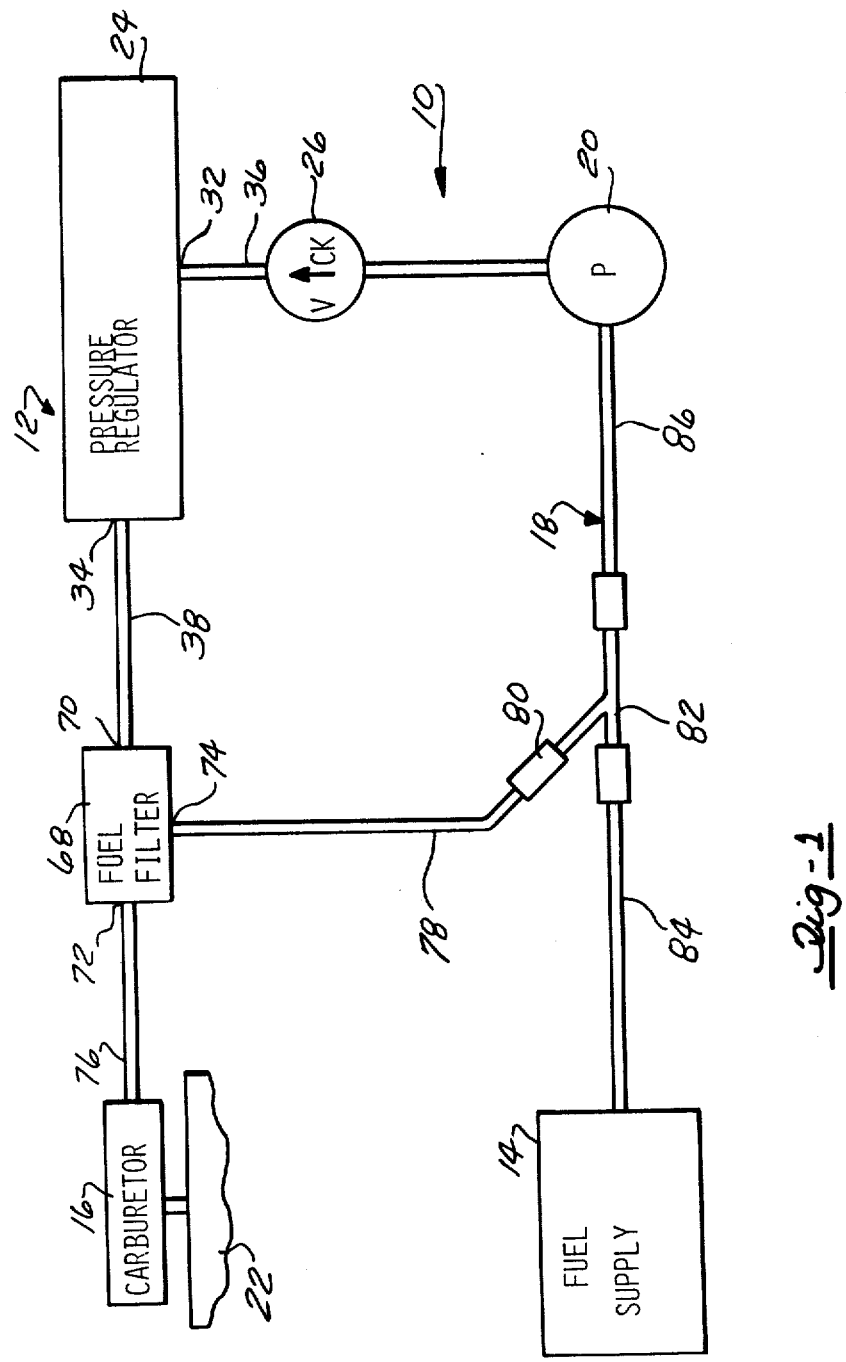
FIG. 1 is a schematic representation of the pressure regulator system of the present invention.

Throughout the following description and drawing, identical reference numbers are used to refer to the same component shown in multiple figures of the drawing.

Referring now to the drawing, and to FIG. 1 in particular, there is illustrated a fuel/air mixing system 10 incorporating a pressure regulator 12 which is adapted for use in an internal combustion engine, not shown.

The fuel/air mixing system 10 includes a fuel supply 14, such as a fuel tank, which houses conventional fuel, such as gasoline, used in internal combustion engines disposed in vehicles, such as automobiles. In a conventional vehicle, the fuel supply 14 is connected to the carburetor 16 of the engine via a fuel supply conduit, shown generally by reference number 18. A fuel pump 20 is disposed in fluid communication with the fuel supply conduit 18 to pump fuel from the fuel supply 14 to the carburetor 16.

As is conventionally known, the carburetor 16 functions to mix fuel and air in a proper ratio and to deliver the fuel/air mixture to the intake manifold 22 of the engine wherein the fuel/air mixture is transferred to the combustion chambers in the cylinders of the engine, not shown, and ignited to produce the explosive forces for driving the pistons of the engine which propel the vehicle.

According to the teachings of the present invention, the pressure regulator apparatus 12 includes a housing 24 interposed with the fuel supply conduit 18 between the fuel supply 14 and the carburetor 16. Preferably, the pressure regulator 12 is connected between the fuel pump 20 and the carburetor 16. A check valve 26 is disposed between the fuel pump 20 and the pressure regulator 12 to provide one way fuel flow therebetween.

Figure 2:
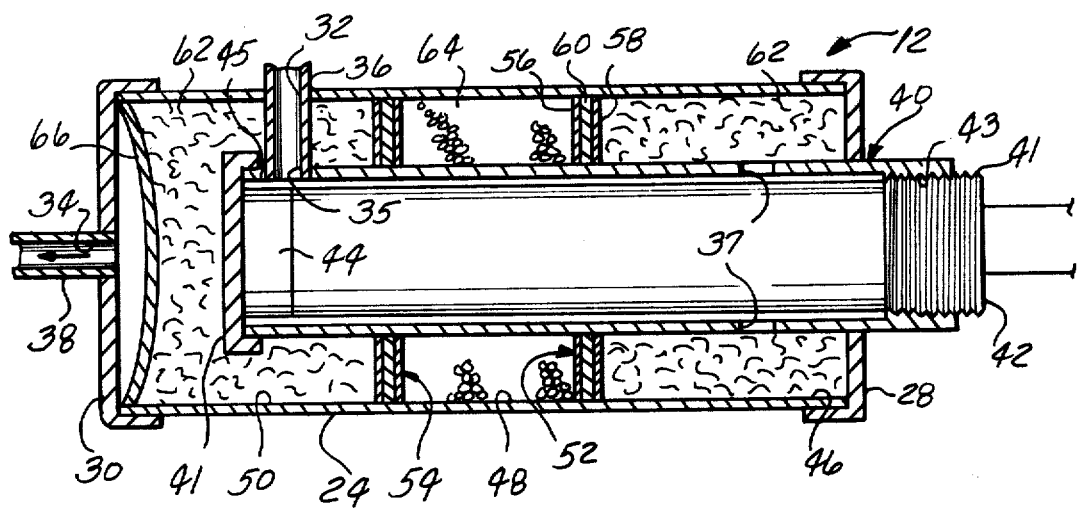
FIG. 2 is a cross sectional view of the pressure regulator shown in FIG. 1.

As shown in greater detail in FIG. 2, the pressure regulator 12 includes a hollow housing 24 of substantially cylindrical configuration. The housing 24 is formed of a metallic material, such as steel, and has end wall members 28 and 30 secured to opposed ends thereof to completely seal its interior. Inlet and outlet ports 32 and 34, respectively, are formed therein. The inlet port 32 is preferably formed in the side wall of the housing 24 and has a segment 36 of the fuel supply conduit 18 extending therethrough and secured thereto in fluid tight sealing relationship. The outlet port 34 is formed in the end wall member 30 and has another segment 38 of the fuel supply conduit 18 secured thereto in fluid flow communication with the interior of the housing 24.

An elongated tubular member 40 is concentrically disposed within the interior of the housing 24. Ideally, the tubular member 40 is formed of a metallic material, such as black pipe, and has its first end extending outward from the housing 24 through an aperture in the end member 28 and its second end spaced a short distance from the second opposed end member 30 within the interior of the housing 24. The tubular member 40 is secured to the end member 28 of the housing 24 by suitable means, such as by soldering. An end cap 41 is welded to the second end of the tubular member 40 to seal the interior thereof. The tubular member 40 has a smaller diameter or cross section then that of the housing 24 so as to form a fluid flow path between the tubular member 40 and the walls of the housing 24, as described in greater detail hereafter. An inlet port 35 is formed at the second end of the tubular member 40 and has one end of the fuel supply conduit 36 secured thereto to define a fluid flow path for the fuel from the fuel supply conduit to the interior of the tubular member 40. A pair of outlet ports 37 are formed adjacent the first end of the tubular member 40 which are in fluid communication with the interior of the hollow housing 24.

A heating element 42 is securely mounted within the tubular member 40. Preferably, the heating element 42 is in the form of a high watt density heater having an incoloy sheath material disposed about the exterior thereof.

The heating element 42 is concentrically mounted within the tubular member 40 by means of external threads 41 formed adjacent the first end of the heater 42 which threadingly engage internal threads 43 formed in the first end of the tubular member 40. In this manner, the heating element 42 may be inserted and secured within the tubular member 40 as well as removed for repair or replacement. As shown in FIG. 2, a pair of electrical connections or wires extend outward from the heating element 42 and are adapted to be connected to a suitable power source for providing electrical current to the heating element 42. The heating element 42 has a smaller diameter than that of the tubular member 40 so as to dispose the outlets 37 between the spaced surfaces of the heating element 42 and the walls of the tubular member 40.

A suitable temperature sensing means 44 is integrally formed in the second end of the tubular member 40. The sensing means 44, which may be a conventional thermocouple unit, senses the temperature of the heating element 42. Suitable electrical connecting means, not shown, extend from the sensing means 44 to a conventional temperature control means, also not shown, so as to control the connection of electrical current to the heating element 42 and thereby maintain the temperature of the heating element 42 within a predetermined temperature range. Ideally, the temperature of the heating element 42 is maintained between a 170° and 175° so as to heat the fuel flowing therepast to an optimum temperature for complete combustion in the engine.

As shown in FIG. 2, first, second and third co-linear chambers 46, 48 and 50 are formed within the housing 24 in the space between the outer surface of the tubular member 40 and the walls of the housing 24. The chambers 46, 48 and 50 are formed by disposing suitable dividers in the form of first and second spaced filters 52 and 54 linearly along the length of the housing 24. The first and second filters 52 and 54 thus divide the housing 24 into the first, second and third chambers 46, 48 and 50, respectively.

Each of the filters 52 and 54 is identically constructed of first and second, spaced, metallic mesh elements 56 and 58 of substantially circular, disc-like configuration. Each of the circular disc members 56 and 58 has a central aperture formed therein through which the tubular member 40 is inserted. In addition, the disc members 56 and 58 may be secured at their outer ends to the side walls of the housing 24 by any conventional means. An intermediate filter media 60 formed of a conventional cellulose filter material is disposed between the metallic mesh members 56 and 58. The filter media 60 functions to filter the fuel flowing through the various chambers of the housing 24, as described in greater detail hereafter.

Again referring to FIG. 2, the first and third chambers 46 and 50 are filled with a wire mesh material 62. Preferably, the wire mesh is constructed of stainless steel which is disposed in a plurality of turns within the first and third chambers 46 and 50 to substantially fill the entire internal volume thereof.

The second chamber 48 has a catalytic agent material 64 disposed therein. Preferably, the catalytic material is that used in conventional automotive catalytic converters and is in the form of platinum on alumina pellets. This material reacts with the fuel flowing through the housing 24 to provide a more complete burn of the fuel within the engine and thereby reduce the pollutants issuing from the exhaust system of the vehicle.

A third filter 66 is disposed adjacent the second end of the housing 24 and is constructed of wire mesh to further filter the fuel flowing from the housing 24 through the outlet port 34.

In operation, the fuel pumped by the fuel pump 20 from the fuel supply 14 flows through the various segments of the fuel supply conduit 18 into the housing 24 via the inlet port 32 and enters the interior of the tubular member 40. The fuel passes through the tubular member 40 between inlet 35 and outlets 37 and its temperature is raised to a predetermined range as it flows over the heating element 42. The fuel then exits through outlets 37 into housing 24 and flows successively through the first, second and third chambers 46, 48 and 50, respectively, before exiting through the outlet port 34 of the housing 24.

Referring again to FIG. 1, a fourth filtering means 68 in the form of a conventional automotive fuel filter is disposed in the fuel supply conduit 18 between the outlet port 34 of the pressure regulator 12 and the inlet of the carburetor 16. The fuel filter 68, in addition to its inlet port 70, has first and second outlet ports 72 and 74. The first outlet port 72 is connected via a segment 76 of the fuel supply conduit 18 to the carburetor 16 for transmitting the conditioned fuel from the pressure regulator 12 to the carburetor 16 and thence to the intake manifold 22 of the engine. The second outlet port 74 of the fuel filter 68 is connected via conduit 78 and a conventional sealing member 80 to a Y-shaped connector 82. The Y-connector 82 is disposed in fluid flow communication with segments 84 and 86 of the fuel supply conduit 18 which extend between the fuel supply 14 and the fuel pump 20. The conduit 78 and the Y-connector 82 thus function to provide a bypass loop between the outlet port 34 and the inlet port 32 of the pressure regulator 12 for passing a portion of the conditioned fuel back into the pressure regulator 12 so as to regulate the internal pressure within the pressure regulator system.

In another embodiment of the present invention, improved engine performance can be realized by adding or mixing a synthetic based fuel with the conventional fuel and introducing the combined mixture into the intake manifold 22 of the engine. According to the teachings of the present invention, the synthetic based fuel is in the form of a cellulose nitrate suspension which results from chemical treatment of conventional gun powder. The cellulose nitrate suspension functions to provide complete combustion when combined with the conventional fuel so as to decrease the level of pollutants issuing from the vehicle exhaust system. In addition, the cellulose nitrate suspension provides increased energy during its combustion which further improves engine performance.

According to the teachings of the present invention, the synthetic based cellulose nitrate suspension is mixed with the conventional fuel by one of two methods. In a first method, a predetermined quantity of the cellulose nitrate suspension is added directly to the fuel supply 14, such as by pouring a predetermined quantity of the suspension into the fuel tank of the vehicle. The synthetic based cellulose nitrate suspension mixes with the conventional fuel in the fuel tank and flows through the pressure regulator 12 of the present invention into the engine in the same manner as described above.

Figure 3:
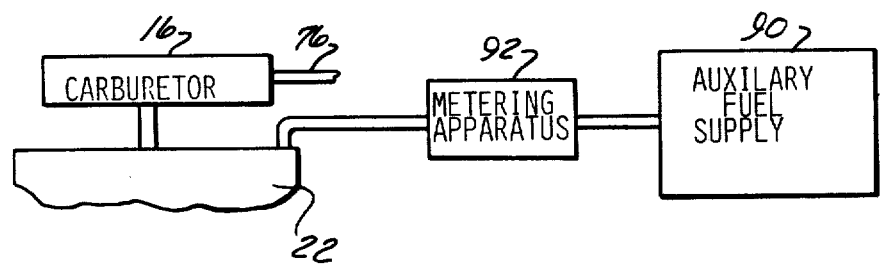
FIG. 3 is a partial schematic representation of a pressure regulator constructed according to another embodiment of the present invention.

Alternately, an auxiliary fuel supply 90, as shown in FIG. 3, may be provided in the vehicle. The auxiliary fuel supply 90 functions to store a quantity of the synthetic based cellulose nitrate suspension. Suitable metering apparatus 92 is disposed in fluid flow communication between the auxiliary fuel supply 90 and the intake manifold 22 via conventional conduits or fuel lines. The metering apparatus 92 serves to administer predetermined metered quantities of the synthetic based cellulose nitrate suspension into the intake manifold 22 of the vehicle wherein it mixes with the conditioned fuel entering the intake manifold 22 from the carburetor 16.

Thus, there has been described a new and improved pressure regulator system for use in an internal combustion engine powered vehicle which provides improved engine performance as well as reduced pollutant levels issuing from the vehicle exhaust system. The pressure regulator of the present invention is in the form of a single unitary device or apparatus which functions to condition the fuel prior to its entry into the intake manifold of the engine so as to simultaneously increase its combustion characteristics and thereby improve engine performance as well as reducing pollutant levels issuing from the vehicle exhaust system.

We claim:

1. An automatic liquid thermal pressure regulator and balancing system adapted for use in an internal combustion engine having a carburetor and a fuel supply conduit for conducting fuel from a fuel supply to said carburetor comprising:

- a housing having inlet and outlet ports, said housing adapted to be interposed with said fuel supply conduit between said fuel supply and said carburetor, with said outlet port of said housing adapted to be disposed in fluid flow communication with said carburetor;
- a tubular member disposed within said housing and having an inlet and an outlet, said fuel supply conduit adapted to extend through said housing and be disposed in fluid flow communication with said inlet of said tubular member, said outlet of said tubular member disposed in fluid flow communication with the interior of said housing;
- a heating element concentrically disposed within said tubular member and spaced therefrom;
- first, second and third co-linear chambers formed within said housing, said outlet of said tubular member disposed in fluid flow communication with said first chamber and said outlet port of said housing disposed in fluid flow communication with said third chamber;
- a metallic mesh material disposed within said first and third chambers surrounding said tubular member;
- a catalytic agent disposed within said second chamber; and
- wherein fuel enters said housing and flows through said tubular member from said inlet to said outlet and is heated by said heating element to a predetermined temperature, said fuel exiting through said outlet of said tubular member and flowing consecutively through said first, second and third chambers wherein it reacts with said catalytic agent before exiting through said outlet port of said housing.

2. The pressure regulator of claim 1 further including:

- temperature sensing means disposed within the tubular member for sensing the temperature of the heating element; and
- temperature control means, responsive to said temperature sensing means, for maintaining the temperature of said heating element within a predetermined range.

3. The pressure regulator of claim 1 further including first and second filter means disposed within the housing and interposed respectively between and defining the first, second and third chambers.

4. The pressure regulator of claim 1 further including external filter means adapted to be interposed between the outlet port of the housing and the carburetor.

5. The pressure regulator of claim 4 further including bypass means including a conduit adapted to extend in fluid flow communication between the external filter means and the fuel supply conduit in advance of the inlet port of the housing.

6. The pressure regulator of claim 1 wherein the catalytic agent includes platinum on alumina pellets.

7. The pressure regulator of claim 1 further including a supply of cellulose nitrate suspension adapted to be added in predetermined quantities to the fuel flowing into the engine.

8. The pressure regulator of claim 7 wherein the cellulose nitrate suspension is added directly to the fuel supply.

9. The pressure regulator of claim 7 wherein the cellulose nitrate solution is added in metered quantities to the intake manifold of the internal combustion engine.

10. The pressure regulator of claim 7 further including:

- auxiliary supply means for storing the cellulose nitrate suspension; and
- metering apparatus disposed in fluid communication with said auxiliary supply and the intake manifold of the engine for supplying the cellulose nitrate suspension to the engine in metered quantities.

* * * * *